Dec. 31, 1968   S. P. RUDZINSKI   3,419,273
HUNTING ARROWHEAD WITH OFFSET CUTTING EDGES
Filed May 4, 1965

Inventor,
Stanley P. Rudzinski,
By: Wolfe, Hubbard, Voit & Osann,
Attys

United States Patent Office 3,419,273
Patented Dec. 31, 1968

3,419,273
HUNTING ARROWHEAD WITH OFFSET
CUTTING EDGES
Stanley P. Rudzinski, 1156 S. Lombard Ave.,
Oak Park, Ill. 60304
Filed May 4, 1965, Ser. No. 453,115
3 Claims. (Cl. 273—106.5)

ABSTRACT OF THE DISCLOSURE

A hunting arrowhead with a diverging body having a series of triangular projections of increasing size from front to rear on each edge of the body which projections are variously bent from the plane of the body to present a series of cutting edges which make separate incisions and wedge open such incisions.

---

This application relates generally to hunting arrows, and more particularly to improvements in lethal arrowheads therefor.

A wide variety of lethal arrowheads for hunting various types of game are well known in the art. All such arrowheads are lethal if the aim is true and the arrowhead strikes a vital organ of the game. Where the aim of the bowman is faulty or the arrow is deflected by the bone structure of the animal, for example, and the arrowhead does not strike a vital organ, death must be brought about, if it is to be brought about at all, by profuse hemorrhaging of the animal. It is characteristic of many arrowheads today, however, that they enter the game by making a single, clean incision much in the same manner as a knife, and in many cases the animal is able to remove the arrow through practically the same incision that it made during entry by rubbing against a tree or other object. The wound is thus relatively small and the amount of hemorrhaging insufficient to cause death or results in death only after a long period of suffering.

Accordingly, it is an objective of the present invention to provide for hunting purposes a lethal arrowhead which enters the body of the game at which it is fired so as to cause a relatively large wound which will result in profuse hemorrhaging sufficient to cause the death of the animal within a reasonably brief time.

It is another objective of the present invention to provide a lethal arrowhead of the type characterized which, when removal is attempted, will further tear the flesh of the animal so as to increase the size of the wound and therefore the amount of hemorrhaging.

A related object is to provide an arrowhead capable of being projected in a true and accurate flight and of inflicting a serious wound causing profuse hemorrhaging and death in a relatively short time even if a vital organ is not hit.

These and other objects of the invention will become apparent from a reading of the following detailed description, when taken in conjunction with the appended drawings wherein.

While certain embodiments of the invention have been shown and will be hereinafter described in detail, there is no intention to limit the invention to the particular forms disclosed but, on the other hand, the intention is to cover all modifications and adaptations falling within the spirit and scope of the invention as characterized in the appended claims.

Figure 1:
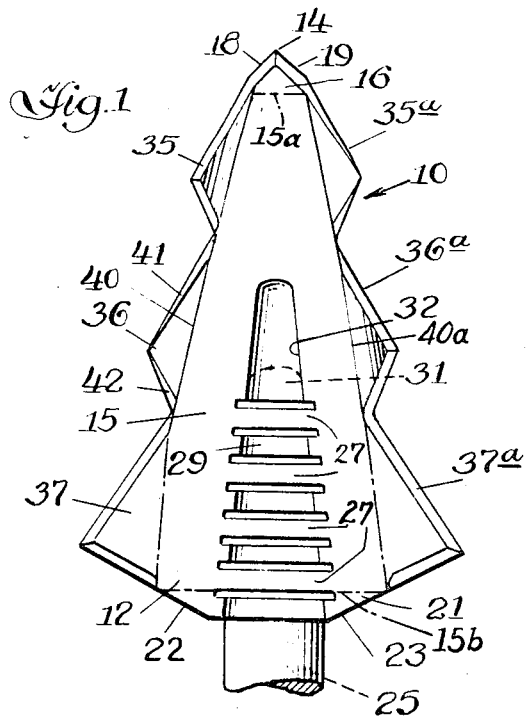
FIGURE 1 is a plan view of an arrowhead constructed in accordance with the present invention.

Referring to the drawings and particularly to FIG. 1, an arrowhead 10 embodying the present invention is illustrated. The arrowhead comprises a relatively flat main body portion 12, having a generally V-shaped or tapered configuration terminating in a point 14 at the front edge in the direction of flight. In more detail, the general V-shape of the body portion 12 of the preferred form of the arrowhead comprises a central trapezoidal configuration 15 indicated by dashed lines 15a, 15b and lines 40 and 40a and having its shorter dimension at the front and sloping sides diverging from front to rear at a relatively sharp, steep angle. At the front of the trapezoidal portion 15 and across the short dimension 15a is a triangular front section 16 forming the flat point 14. The two leading or forward edges 18, 19 of the triangular front section 16 diverge at a relatively large angle such that the front section is shallow or short. At the rear of the central trapezoidal configuration 15 and across its larger rear dimension is a second trapezoidal shape 21 having rearwardly and inwardly sloping sides 22, 23 which intersect the ends of the short rear edge.

Means are provided for receiving and holding the front end portion of an arrow shaft 25 to the arrowhead. Such means may take any desired form. In the illustrative embodiment of the invention shown in FIGS. 1 through 3, the attaching means includes a series of semicircular ribs or bands 26, 27 stamped from the material forming the body of the arrowhead. The ribs or bands are of decreasing radius from rear to front and alternate ones 26 are pressed above the body portion and the other bands 27 are pressed below the body portion. The alternate location of individual bands of the series and the decreasing radii cause the bands to define a tapering cavity or hole for receiving the forward end 29 of the arrow shaft 25. An arrow shaft 25 firmly pressed into the cavity or hole so formed is wedged into the head 10 and the two parts of the arrow are securely held together. If desired, the forward end 31 of the shaft 25 may be held in a semiconical shield 32 pressed from the arrowhead body 12 immediately ahead of the first band or rib 27.

In keeping with the present invention, the main body portion 12 of the arrowhead 10 is provided with a plurality of cutting edges. For this purpose a plurality of projections or teeth 35, 36, 37, 35a, 36a, 37a are provided on the body 12 of the arrowhead 10. In the preferred embodiment, an equal series of projections is formed on each side of the central axis of the arrowhead with the projections increasing successively in size from the front to the rear of the head. As illustrated in the drawing, the smallest projections 35, 35a are adjacent the front or nose of the head and are followed by intermediate size projections 36, 36a. Larger projections 37, 37a are formed adjacent the rear of the head.

The individual projections or teeth 35, 35a, 36, 36a, 37, 37a are triangular in outline. One side 40 of each projection is formed by a line of junction with the main body portion 12. A second side 41 slopes outwardly and rearwardly from the front of the junction to the outermost point of the projection. The third side 42 slopes inwardly and rearwardly from the apex of the projection to the rear of the junction. The second side 41 which faces forwardly constitutes the cutting edge as the arrowhead enters the animal being shot. For this purpose, the second side 41 is beveled or otherwise suitably sharpened to a cutting edge.

It is a feature of the present invention that the arrowhead makes a number of distinct cuts or slices as it enters the game at which it is aimed. To this end, projections 35, 35a, 36, 36a, 37, 37a are angularly inclined with respect to one another so that viewing the arrow (FIG. 3) in its line of flight, the projected profile of the arrowhead and of each cutting edge comprises a plurality of distinct lines radiating from the central part of the arrowhead.

Figure 2:
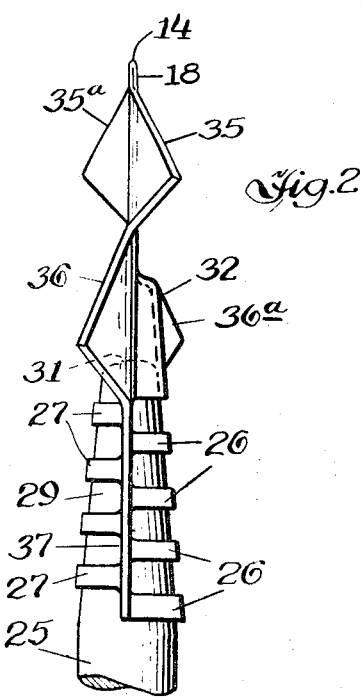
FIG. 2 is a view transverse to the plane of the main body portion of the arrowhead of FIG. 1 illustrating the arrangement of the projections formed thereon.
Figure 3:
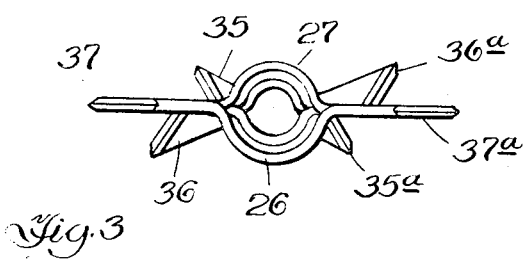
FIG. 3 is a rear view of the arrowhead as it would be seen in flight, observed in the line of flight.

More particularly, referring to FIG. 2, in order to enlarge the flight profile of the arrowhead, projections 35, 35a are inclined from the plane of the main body portion, one of the front projections 35 being inclined upwardly from the plane and the other opposed or mating front projection 35a is inclined downwardly (as viewed in FIG. 3). In a like manner, the projections 36, 36a are alternately inclined from the plane of the main body portion at a suitable angle. Projection 36a behind projection 35a is inclined upwardly from the plane, and the opposite projection 36 behind projection 35 is downwardly inclined. Thus, viewed from its line of flight, the cutting edge of each projection of the arrowhead 10 lies in a separate plane from the cutting edge of any other projection. The width of the arrowhead is thus substantially enlarged and when it strikes the animal at which it is aimed each of the projections makes a separate and distinct incision, opening a substantial wound for the purpose of causing severe hemorrhaging and death.

In addition to the straight cutting action of each projection the angling of the first and second sets of projections 35, 35a, 36, 36a from the plane of the main portion of the body 12 also causes tearing. This is accomplished by forming the line of junction or intersection 40 between the projection and the body on an angle with respect to the direction of flight. In the arrowhead of the drawing it will be seen that the line of junction or intersection is along the diverging side of the central trapezoidal portion 15 of the body portion. As a consequence, not only does the leading, cutting edge 41 of the projection cause an incision but, in addition, the outer face of each of the angled projections 35, 35a, 36, 36a tends to spread and tear the incision by a wedging action.

As previously noted, entry of the arrowhead into the game is facilitated by the sharpening of the forward edges 41 of the projections as well as the point 14. Further, in keeping with the present invention the rearward edges 42 of the projections are likewise sharpened so that when the arrowhead is withdrawn either by action of the animal or by some other means, a further cutting action is provided. Particularly where the animal attempts to remove the arrowhead by rubbing against an object, the rear cutting action will result in greater opening of the wound and therefore greater hemorrhaging. Thus, death is brought about as quickly as possible.

Figure 5:
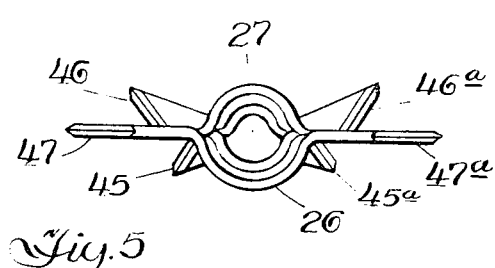
FIG. 5 is a view of the arrowhead configuration of FIG. 4, viewed in the line of flight thereof.
Figure 4:
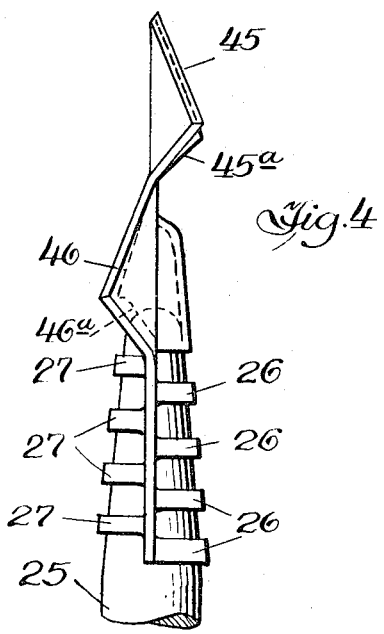
FIG. 4 is a modified arrowhead in accordance with the invention, viewed in substantially the same manner as FIG. 2.

Referring to FIGS. 4 and 5, a modified form of the present arrowhead is shown. In its modified form elements identical to those of FIGS. 1 to 3 have the same reference numerals. In the modified form opposed projections are both inclined in one direction with respect to the plane of the main body portion of the arrowhead, rather than oppositely inclined above and below as in the first embodiment. Thus, the front projections 45, 45a are both inclined downwardly and the next projections 46, 46a are both inclined upwardly. As viewed in FIG. 5, the profile in the direction of flight is slightly modified, but in essence it provides a wide, thick profile for opening a relatively large wound in the animal.

I claim as my invention:

1. An arrowhead comprising, in combination, a substantially flat main body portion having means for attachment to the forward end of an arrow shaft, said main body portion being of substantially regular trapezoidal shape with its shorter edge in front and its sloping sides diverging from front to rear, said shorter edge having a forward triangular point having a length less than one fourth the length of the arrowhead with the edges thereof diverging to form a relatively shallow angle, therebetween a series of triangular projections integral with the body portion, each of said projections having one side forming a line of junction with a diverging sloping side of said body portion, each of said lines of junction being longer than the length of said triangular point, a second forwardly facing side sloping rearwardly and outwardly from said line of junction with said body portion, and a third rearwardly facing side sloping rearwardly and inwardly from the outer end of said second side to the body portion, the second side of each of said projections and the triangular point of said body portion having knife-like cutting edges, at least certain of the projections on one side of said body portion being bent along the line of junction into a plane different from the plane occupied by any other projection on the same side such that each projection cuts a separate and distinct incision from the incision cut by any other projection.

2. An arrowhead comprising, in combination, a substantially flat main body portion having means for attachment to the forward end of an arrow shaft, said main body portion being of substantially regular trapezoidal shape with its shorter edge in front and its sloping sides diverging from front to rear, said shorter edge having a forward triangular point, a series of triangular projections integral with the body portion and joined thereto along each of its diverging angular side edges, each of said projections having one side forming a line of junction with said body portion at an angle to the line of flight, a second forwardly facing side sloping rearwardly and outwardly from said body portion and away from said diverging side edges, and a third rearwardly facing side sloping rearwardly and inwardly from the outer end of said second side to the body portion, the second and third sides of each of said projections and the triangular point of said body portion having knife-like cutting edges, a plurality of the projections on one side of said body portion being bent along the line of junction into a plane different from the plane occupied by any other projection on the same side such that each projection cuts a separate and distinct incision from the incision cut by any other projection and tears apart an incision made by the cutting edge.

3. An arrowhead comprising, in combination, a substantially flat main body portion having means for attachment to the forward end of an arrow shaft, said main body portion being of substantially regular trapezoidal shape with its shorter edge in front and its sloping sides diverging from front to rear, said shorter edge having a forward triangular point, a series of triangular projections increasing in size from front to rear integral with the body portion, each projection being joined at one edge to said body along a junction line at a diverging angular side edge of said body, a second forwardly facing side sloping rearwardly and outwardly from said junction line, and a third rearwardly facing side sloping rearwardly and inwardly from the outer end of said second side to the body portion, the second side of each of said projections and the triangular point of said body portion having knife-like cutting edges, at least certain of the projections of the series on one side of said body portion being alternately bent upwardly and downwardly along the line of junction into a plane different from the place occupied by any other projection on the same side such that each projection cuts an incision radiating from the central part of the arrowhead and separate and distinct from the incision cut by any other projection.

References Cited

UNITED STATES PATENTS

| D. 172,196 | 5/1954 | Roper | 273—106.5 |
| 2,589,137 | 3/1952 | Ramsey | 273—106.5 |
| 2,691,527 | 10/1954 | Ramsey | 273—106.5 |
| 2,820,637 | 1/1958 | La Ford | 273—106.5 |
| 2,909,372 | 10/1959 | Neri | 273—106.5 |

LOUIS G. MANCENE, *Primary Examiner.*

S. NATTER, *Assistant Examiner.*